(12) United States Patent
Rence

(10) Patent No.: US 11,455,879 B2
(45) Date of Patent: Sep. 27, 2022

(54) VEHICLE SAFETY ALERT SYSTEM

(71) Applicant: Christopher Joseph Rence, Minnetonka, MN (US)

(72) Inventor: Christopher Joseph Rence, Minnetonka, MN (US)

( * ) Notice: Subject to any disclaimer, the term of this patent is extended or adjusted under 35 U.S.C. 154(b) by 0 days.

(21) Appl. No.: 17/303,375

(22) Filed: May 27, 2021

(65) Prior Publication Data

US 2021/0383670 A1 Dec. 9, 2021

Related U.S. Application Data

(60) Provisional application No. 63/000,703, filed on Mar. 27, 2020.

(51) Int. Cl.
| | |
|---|---|
| *G08B 23/00* | (2006.01) |
| *G08B 21/22* | (2006.01) |
| *G08B 21/18* | (2006.01) |
| *G08B 25/00* | (2006.01) |
| *B60H 1/00* | (2006.01) |
| *G07C 9/00* | (2020.01) |
| *B60N 2/00* | (2006.01) |

(52) U.S. Cl.
CPC ......... *G08B 21/22* (2013.01); *B60H 1/00742* (2013.01); *B60N 2/002* (2013.01); *G07C 9/00182* (2013.01); *G07C 9/00309* (2013.01); *G08B 21/182* (2013.01); *G08B 25/008* (2013.01); *G07C 2009/00285* (2013.01); *G07C 2009/00301* (2013.01); *G07C 2009/00984* (2013.01)

(58) Field of Classification Search
CPC .... G08B 21/22; G08B 21/182; G08B 25/008; B60H 1/00742; B60N 2/002; G07C 9/00182; G07C 9/00309; G07C 2009/00285; G07C 2009/00301; G07C 2009/00984
USPC ...................................................... 340/573.1
See application file for complete search history.

(56) References Cited

U.S. PATENT DOCUMENTS

| | | | |
|---|---|---|---|
| 6,250,671 B1 * | 6/2001 | Osmer ................ | B60R 21/0152 180/271 |
| 6,753,780 B2 | 6/2004 | Li | |
| 7,250,869 B2 * | 7/2007 | Davis ..................... | B60N 2/002 340/539.11 |
| 7,321,306 B2 | 1/2008 | Lee et al. | |
| 7,348,880 B2 * | 3/2008 | Hules .................. | B60R 25/1004 340/425.5 |
| 7,796,021 B2 * | 9/2010 | Saban ................... | B60N 2/002 701/29.1 |

(Continued)

*Primary Examiner* — Zhen Y Wu
(74) *Attorney, Agent, or Firm* — Dunlap Bennett & Ludwig, PLLC

(57) ABSTRACT

A system for indicating occupant presence within a vehicle is disclosed. The system includes a driver's seat that has a plurality of sensors, a passenger's seat that has a plurality of sensors, and an electronic control unit. The electronic control unit is operatively associated with and in communication with the sensors. The electronic control unit initiates an alert in the form of, for example, a car alarm and/or message and is capable of performing other safety actions based upon predetermined conditions being met that are based on information received from the sensors in the driver's seat and the passenger's seat.

8 Claims, 1 Drawing Sheet

(56) References Cited

U.S. PATENT DOCUMENTS

| | | | |
|---|---|---|---|
| 8,058,983 B1* | 11/2011 | Davisson | G08B 21/24 |
| | | | 340/457 |
| 8,836,491 B2 | 9/2014 | Rao et al. | |
| 9,014,920 B1 | 4/2015 | Torres et al. | |
| 9,187,010 B2 | 11/2015 | Bujak et al. | |
| 9,206,637 B2 | 12/2015 | Percher | |
| 9,227,484 B1* | 1/2016 | Justice | B60H 1/00778 |
| 9,381,856 B1 | 7/2016 | Arnold et al. | |
| 9,469,176 B2 | 10/2016 | Boyer et al. | |
| 9,604,571 B1 | 3/2017 | Kurtovic | |
| 9,630,496 B2 | 4/2017 | Cuddihy et al. | |
| 9,663,032 B1* | 5/2017 | Appukutty | B60Q 9/00 |
| 9,685,063 B2 | 6/2017 | Cohen et al. | |
| 9,758,016 B1 | 9/2017 | Baron et al. | |
| 9,796,371 B2* | 10/2017 | Soifer | B60W 10/30 |
| 9,809,085 B1* | 11/2017 | Pierce | B60H 1/00985 |
| 9,845,050 B1 | 12/2017 | Garza et al. | |
| 10,134,258 B2 | 11/2018 | Chacon, Jr. et al. | |
| 10,195,988 B1* | 2/2019 | Garza | B60Q 9/00 |
| 10,781,782 B1* | 9/2020 | Malesevich | F02N 11/0803 |
| 2002/0145516 A1 | 10/2002 | Moskowitz et al. | |
| 2009/0204297 A1* | 8/2009 | Friedman | B60H 1/00742 |
| | | | 701/46 |
| 2009/0234542 A1 | 9/2009 | Orlewski | |
| 2015/0005982 A1* | 1/2015 | Muthukumar | B60T 8/1725 |
| | | | 701/1 |
| 2015/0332578 A1* | 11/2015 | Borgne | B60N 2/26 |
| | | | 340/667 |
| 2016/0031342 A1 | 2/2016 | Camello et al. | |
| 2016/0249191 A1* | 8/2016 | Avrahami | H04W 4/12 |
| 2017/0129399 A1* | 5/2017 | Appukutty | B60N 2/2872 |
| 2017/0158186 A1* | 6/2017 | Soifer | B60H 1/00742 |
| 2017/0282822 A1 | 10/2017 | Hunter, Jr. | |
| 2018/0130327 A1* | 5/2018 | Rogers | B60N 2/002 |
| 2018/0370431 A1* | 12/2018 | Wincek | G10L 25/78 |
| 2019/0088104 A1 | 3/2019 | Crewe et al. | |
| 2019/0126779 A1 | 5/2019 | Saitou et al. | |
| 2019/0232818 A1 | 8/2019 | Gangu | |
| 2020/0058210 A1* | 2/2020 | Williams | G07C 5/08 |
| 2020/0238786 A1* | 7/2020 | Murphy | B60H 1/00821 |
| 2020/0290567 A1* | 9/2020 | Funyak | B60R 25/102 |
| 2020/0334453 A1* | 10/2020 | Thomas | B60R 21/01512 |
| 2021/0008959 A1* | 1/2021 | Lee | B60H 1/00978 |

* cited by examiner

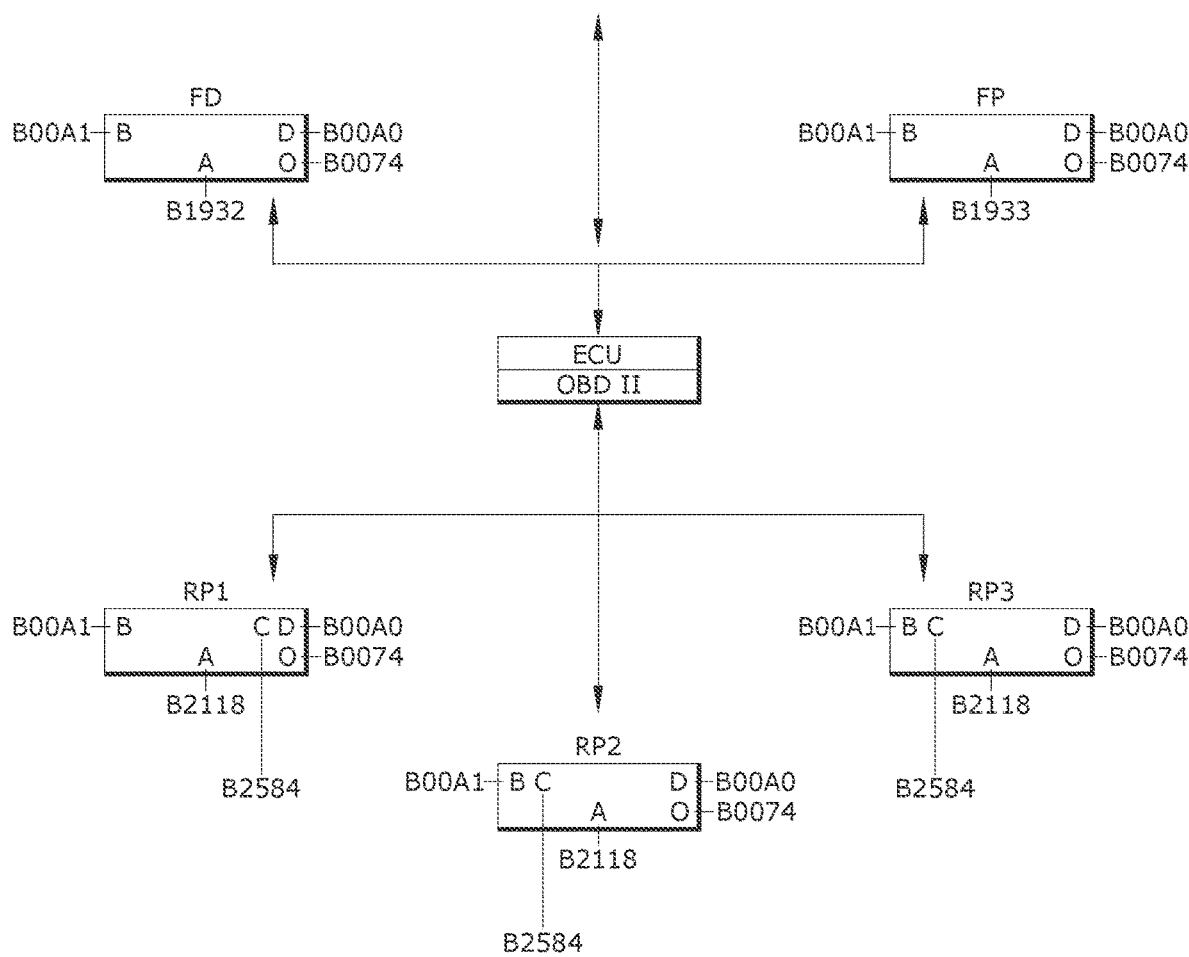

VEHICLE SAFETY ALERT SYSTEM

CROSS-REFERENCE TO RELATED APPLICATION

This application claims the benefit of priority of U.S. provisional application No. 63/000,703, filed Mar. 27, 2020, the contents of which are herein incorporated by reference.

BACKGROUND OF THE INVENTION

The present invention relates to a vehicle alert system and, more particularly, to a vehicle safety alert system that alerts the driver or manufacturer if a child or other person has been left in a car.

In 2018, an estimated fifty-three children died in vehicles due to heat stroke, with the national average being greater than thirty children under the age of 5 dying per year in the United States of America (USA) in vehicles. Today's standard car technology could have prevented these tragedies with very little added cost to the cars electronic control units (ECUs), as will be described in greater detail herein. At present, there is no vehicle manufacturer with a solution to the problem of deaths in vehicles due to heat exposure.

Global car manufacturer ECUs collect all the data required to take actions, but they have not been able to correlate data from sensors to provide the alerting necessary to prevent an issue that can cause the loss of life. Manufacturers fail to look at preventive outcomes, but rather just focus on reactive outcomes of the current technology.

As can be seen, there is a need for a vehicle safety alert system that alerts the driver or manufacturer if a child or other person has been left in a car.

SUMMARY OF THE INVENTION

In one aspect of the present invention, a system for indicating occupant presence within a vehicle includes: a driver's seat including a first airbag sensor and a first seatbelt sensor; a passenger's seat including a second airbag sensor and a second seatbelt sensor; and an electronic control unit operatively associated with and in communication with the first airbag sensor, the first seatbelt sensor, the second airbag sensor, and the second seatbelt sensor, the electronic control unit being configured to initiate an alert when: the first airbag sensor and first seatbelt sensor are disengaged; the second airbag sensor and the second seatbelt sensor are engaged; and a vehicle key fob either sends a lock signal to the electronic control unit or is distanced from the vehicle a predetermined amount.

In another aspect of the present invention, a system for indicating occupant presence within a vehicle includes: a driver's seat including a first airbag sensor and a first seatbelt sensor; a passenger's seat including a second airbag sensor, a second seatbelt sensor, and an occupant classification sensor; and an electronic control unit operatively associated with and in communication with the first airbag sensor, the first seatbelt sensor, the second airbag sensor, the second seatbelt sensor, and the occupant classification sensor, the electronic control unit being configured to initiate an alert when: the first airbag sensor and first seatbelt sensor are disengaged; the occupant classification sensor detects the presence of a child in the passenger's seat; the second airbag sensor and the second seatbelt sensor are engaged; and a vehicle key fob either sends a lock signal to the electronic control unit or is distanced from the vehicle a predetermined amount.

In yet another aspect of the present invention, system for indicating occupant presence within a vehicle includes: a driver's seat including a first airbag sensor and a first seatbelt sensor; a passenger's seat including a second airbag sensor and a second seatbelt sensor; a vehicle interior heat sensor; a window or sunroof; and an electronic control unit operatively associated with and in communication with the first airbag sensor, the first seatbelt sensor, the second airbag sensor, the second seatbelt sensor, and the vehicle interior heat sensor, the electronic control unit being configured to open the window or sunroof when: the first airbag sensor and first seatbelt sensor are disengaged; the second airbag sensor and the second seatbelt sensor are engaged; and a vehicle internal temperature detected by the vehicle interior heat sensor is above a predetermined threshold for a predetermined amount of time.

These and other features, aspects and advantages of the present invention will become better understood with reference to the following drawings, description and claims.

BRIEF DESCRIPTION OF THE DRAWINGS

The following FIGURE is included to illustrate certain aspects of the present disclosure, and should not be viewed as exclusive embodiments. The subject matter disclosed is capable of considerable modifications, alterations, combinations, and equivalents in form and function, without departing from the scope of this disclosure.

The sole FIGURE is a schematic view of an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

A system for indicating occupant presence within a vehicle is disclosed. The system includes a driver's seat that has a plurality of sensors (such as airbag, seatbelt, and occupant classification sensors), a passenger's seat that has a plurality of sensors (such as airbag, seatbelt, and occupant classification sensors), and an electronic control unit. The electronic control unit is operatively associated with and in communication with the sensors. The electronic control unit initiates an alert in the form of, for example, a car alarm or message and is capable of performing other safety actions (such as opening one or more vehicle windows) based upon predetermined conditions being met that are based on information received from the sensors in the driver's seat and the passenger's seat.

Referring now to the FIGURE, an embodiment of the present invention present invention in use with a vehicle may include the following:

D: Occupant Classification System—(with corresponding trouble code: B00A0);
B: Occupant Position System—(with corresponding trouble code: B00A1);
O: Seatbelt Sensor—(with corresponding trouble code: B0074)
A: Airbag Sensor—(with corresponding trouble code: B2118)
W: OBD II (On-board Diagnostics II)—Access Port C: Child Seat Detection Circuit Open—(with corresponding trouble code: B2584)
I: Ignition Switch—(with corresponding trouble code: B1353)
FD: Front Driver
FP: Front Passenger
RP1: Rear Passenger 1
RP2: Rear Passenger 2
RP3: Rear Passenger 3
ECU: Electronic Control Unit
OBD II: Code Definitions The present invention leverages conventional automotive sensors on each vehicle seat, such as the occupant classification system D (which includes occupant detection and classification sensors, e.g., it may detect a person and classify that person as a child depending upon size of the person), the occupant position system B, seatbelt sensor O, airbag sensor A, and child seat detection system C, to alert the driver or vehicle monitoring systems that an occupant has been left in the vehicle. There is no solution that addresses this issue. The technology is available in some form as disparate sensors, but the present invention associates them to provide a notification. The OBD II access port W is a port that can be leveraged to access the ECU and used to add additional sensors, if needed. In embodiments of the present invention, most system services are associated with the ignition switch I being engaged. If the vehicle is off and actions need to be taken to start the car (to, for example, open the windows or turn on the HVAC system), the routing leverages paths through the ignition switch. Two exemplary approaches are described below, but a person of ordinary skill in the art will appreciate that other similar scenarios and permutations are within the spirit and scope of the present disclosure.

Exemplary approach 1: Using the manufacturer's logic in the ECU, all sensor functions are fully managed through the ECU. The present invention adds a reference flag to correlate the following scenarios:
  a) A vehicle with rear seats (e.g., RP1, RP2, or RP3 in any row) that the rear seat belt(s) is/are in the locked position (i.e., the seatbelt sensor O senses the seatbelt being engaged with the buckle), and the airbag rear seat sensor A is detected as being engaged (i.e., it detects the presence of an occupant in the seat) is correlated with detection of the front driver FD and front passenger FP air bag sensors A and the seat belt sensors O being in the disengaged mode (meaning they are vacant of a person to trigger the sensor). This data may be (but not required to be) in parallel with an attempt to lock and arm the cars alarm system.
  b) Vehicles with only a front row that the passenger seat belt is in the locked position, the airbag sensor A is detected as being engaged, is correlated with the detection of the driver air bag sensor A and the seat belt sensors O being in the disengaged mode (meaning the driver seat is vacant of a person to trigger the sensor).
  c) For example, if a driver exits his/her car and has left his/her child in the back seat, when he/she goes to arm the cars alarm by pushing the button on a remote or the car performing the lock and arm action based on a key fob perimeter function, the action will not be taken and the car's alarm will be initiated by the ECU if the condition described in a) or b) is true. This will alert the driver to go back to his/her car as he/she will not be able to override the function until the child was removed from the car or the car was started.

Exemplary approach 2: This approach may be used subsequently if the first exemplary approach fails to or would not be otherwise triggered to alert the driver of the car of a child being left behind (e.g., this could serve as an additional life-saving feature in scenarios where a user does not attempt to lock and arm the car or his/her fob may not be enabled with a proximity sensor which automatically locks the vehicle when the fob is a certain distance from the vehicle). Utilizing higher end car features (e.g., sunroof, remote window, HVAC heat controls), the present invention is functional such that:
  a) In conjunction with the previous logic described in the first exemplary approach, included in the ECU are control commands to open the windows and the sunroof, if optioned, based on the internal HVAC heat sensor.
  b) If a driver does not try to activate the remote alarm and door locking process to trigger the previous actions (exemplary approach 1), the ECU will action the following events:
    a. If the car internal temperature is above a predetermined temperature (e.g., 72 degrees Fahrenheit) for more than a predetermined amount of time (e.g., 30 minutes) the ECU will lower the windows and open the vent option on the sunroof.
    b. The ECU will also continue to sound the horn until the occupied seat is disabled through the airbag weight sensor and the seat belt release.

The present invention ties in all the sensors that are standard in the modern car to provide these life-saving solutions without any major re-architecture. The ECU command codes are required, and the access to the ECU is also required through an ECU programming process (e.g., ECUTEK™ tool). The management changes via the ECU program to coordinate the seatbelt sensor O, the airbag sensors A, the ignition offsetting (this is the control for the ignition—if the car is on, the safety services described herein would not engage and if the car is off, the safety services will be in a passive active mode), and the alarm activation attempt are all important aspects of the present invention. This correlation will provide an ongoing alarm until a corresponding pair of the airbag sensor-enabled (ON) and the Seatbelt sensor-enabled (ON) are disconnected. This may be done as an aftermarket reconfiguration or done so at the point of manufacturing.

Optional items will be based on the technology that may or may not be available on the vehicle, e.g., the ability to lower the windows, open the vent of a sunroof, or contact one of the third-party services if available (to respond to various scenarios described herein), such as in-vehicle safety and security systems like GM™ ONSTAR™ or FORD™ SYNC™ services, or contact an owner/operator of the vehicle. Also, the ability to use an internal heat sensor to monitor the cars internal temperature if the seatbelt O and the airbag sensors A are engaged (ON). If the vehicle has this sensor available, this addition will provide an additional level of safety. The internal cabin heat sensor function (ON) could also activate automatically along with a horn or send an error code to GM™ ONSTAR™ or FORD™ SYNC™ and then they could alert the owner via a message (e.g., test, SMS, e-mail). These safety features could save not only a child, but also potentially a pet.

Using the additional open sensor ports available on all of the current manufacturing alarm modules, an embodiment of the present invention provides the seat belt sensors O and the airbag weight sensors A as connected to the alarm module.

If either of these is enabled, the remote car alarm will not arm (i.e., if the vehicle is occupied, the vehicle alarm system cannot be engaged from outside the vehicle). The audible alarm may also provide a rapid note to alert that an occupant is still in the car. The logic is simple, as the basic systems and electronic sensors and impulses are in place in modern vehicles. Testing high-end vehicle sensors, the sunroof and windows can also be integrated into these solutions through the additional open sensor ports available on all the current manufacturing alarm modules. The present invention additionally uses an interior temperature sensor to monitor and can alert a user's mobile device regarding the presence of an occupant (e.g., a child) in the vehicle. The end solution provides basic alerting if one or more of the aforementioned seat sensors are activated, preventing the car alarm from arming (e.g., when a driver exists and tries to set the alarm). In parallel, embodiments of the present invention use interior heat temperature readings to alert the vehicle driver if an occupant (e.g., a child) is in the car and the temperature reaches a predefined range.

The ECU is the centralized control point for all modern vehicles. All sensors that comprise the operations of a vehicle: from engine performance, seat belt activation, tension control, airbag enablement and force based on weight, heating, ventilation, and air conditioning (HVAC) vent control from defroster, to vents, to feet air and temperature control, centralized messaging systems, global positioning system (GPS), BLUETOOTH™, audio input, alarm systems, crash avoidance, crash alerts, parking assist, glass breakage and alarm and all other technology management that ensures a vehicle is operational.

Alternate configurations of the present invention may include the following. Using the same technology as described above, the same ECU code may be aligned to start the vehicle and enable the air conditioning system to reduce the temperature of the car to a predetermined temperature, e.g., 72-degree Fahrenheit, and shut down the car and restart when the temperature rises above the predetermined temperature (in this example, 72 degrees Fahrenheit). Likewise, this principle can be applied to starting the car to heat it up when a temperature drops below a predetermined threshold. This occurs in parallel if the vehicle is equipped with a remote start function and would provide an additional fail-safe to protect the child or other occupants. The ECU code alignment can be leveraged to provide several options depending on the options or defaults the vehicle is enabled with.

A method of making the present invention includes the following. First, the standard ECU commands are taken using an off the self-command access tool (ECU programming guide). The sensor's current alerts and actions are adapted to perform additional functions like setting off an alarm and/or sending a code to a third-party service like GM™ ONSTAR™ or FORD™ SYNC™ to alert of a problem. Each vehicle manufacturer has its own set of ECU codes that need to be reviewed and set to perform a new action based on the sensors being aligned to alert that a child has been left in a car. In parallel, older ECU units in cars as far back as the late 1980s, the ECU dipswitches may be set to continue set off the seatbelt alarm or flash the lights or in some models sound the horn, all based on the seatbelt being engaged. The seatbelt is engaged to hold in the child safety seat, a booster seat or even a small child.

Methods of using the present invention would be readily apparent from the foregoing disclosure, and may further include the following. The problem to be solved is to prevent the death of a child. Using this set of processes to consolidate the ECU processes that are standard on most modern vehicles, the possibility of a child being left in a car unattended and dying due to heatstroke should be greatly reduced either by alerting the driver of the vehicle or persons around the vehicles as the alarm will continue to be enabled. Currently, the aftermarket automotive industry uses the standard ECU programming tools to increase horsepower, increase stability control, activate raising and lowering of a vehicle body, changing the radio station or the vehicle's electrical functions. This change could be generalized to work across any vehicle or be an added ECU module function to provide the sensor actions and alignment.

In certain embodiments, the present invention may develop the ECU command interface as a standalone 16 pin unit that can be plugged into the OBD-II port and provide a set of commands that can be enabled and moved from vehicle to vehicle. This provides the previously described capability to modern cars that would not have this capability from the manufacturer. In certain embodiments, the present invention uses ECUTEK™ PROECU™ product to access the ECU. This allows the modification of the ECU command calls to sync the sensors previously listed (Airbag, Seat Belt, HVAC, Alarm and Horn). The subroutines changes may be made through the ECU programming interface. It will be appreciated that, rather than a re-programming of an already in-use vehicle, the teachings of this invention may also be applied directly at the point of manufacture.

The present invention can additionally have various applications other than the ones described above. ECU units are leveraged in motor vehicles including tractors, small planes, boats, etc. Any vehicle with ECU sensor controls could be modified to add a layer of protection to a child that may be left behind. Taking a tractor as an example, farmers take their children with them into the fields. While this may be a rare scenario, but based on how business goes, a person may forget their child and would benefit from the present invention.

In summary, the present invention recognizes that the ECU unit processing of data can be updated to correlate a few of the core sensors to help save children's lives by alerting the driver that they had left their child unattended in the vehicle. The present invention can have the ECU correlate the sensors such that a preventative action is taken.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

What is claimed is:

1. A system for indicating occupant presence within a vehicle, the system comprising:
   a driver's seat including a first airbag sensor disposed in the driver's seat and a first seatbelt sensor;

a passenger's seat including a second airbag sensor disposed in the passenger's seat and a second seatbelt sensor;

a vehicle interior heat sensor; and an electronic control unit of the vehicle operatively associated with and in communication with the first airbag sensor, the first seatbelt sensor, the second airbag sensor, and the second seatbelt sensor, the electronic control unit being configured to initiate an alert when:

the first airbag sensor and first seatbelt sensor are disengaged;

the second airbag sensor and the second seatbelt sensor are engaged; and a vehicle key fob either sends a lock signal to the electronic control unit or is distanced from the vehicle a predetermined amount, wherein the electronic control unit is configured to start the vehicle and activate a heating, ventilation, and air conditioning system when a temperature detected by the vehicle interior heat sensor rises above or drops below a predetermined threshold, and wherein the electronic control unit is configured to turn off the vehicle when the temperature reaches the predetermined threshold.

2. The system of claim 1, wherein the alert comprises initiating a vehicle alarm.

3. The system of claim 1, wherein the alert comprises a message configured to be sent to an in-vehicle safety and security system.

4. The system of claim 3, wherein the message is further configured to be sent to an owner or an operator of the vehicle.

5. The system of claim 1, wherein the electronic control unit terminates the alert when the second airbag sensor and the second seatbelt sensor become disengaged.

6. The system of claim 1, further comprising a vehicle interior heat sensor and wherein the electronic control unit is configured to lower at least one vehicle window upon the vehicle interior heat sensor detecting a temperature above a predetermined threshold.

7. A system for indicating occupant presence within a vehicle, the system comprising:

a driver's seat including a first airbag sensor disposed in the driver's seat and a first seatbelt sensor;

a passenger's seat including a second airbag sensor disposed in the passenger's seat, a second seatbelt sensor, and an occupant classification sensor;

a vehicle interior heat sensor; and an electronic control unit of the vehicle operatively associated with and in communication with the first airbag sensor, the first seatbelt sensor, the second airbag sensor, the second seatbelt sensor, and the occupant classification sensor, the electronic control unit being configured to initiate an alert when:

the first airbag sensor and first seatbelt sensor are disengaged;

the occupant classification sensor detects the presence of a child in the passenger's seat;

the second airbag sensor and the second seatbelt sensor are engaged; and a vehicle key fob either sends a lock signal to the electronic control unit or is distanced from the vehicle a predetermined amount, wherein the electronic control unit is configured to start the vehicle and activate a heating, ventilation, and air conditioning system when a temperature detected by the vehicle interior heat sensor rises above or drops below a predetermined threshold, and wherein the electronic control unit is configured to turn off the vehicle when the temperature reaches the predetermined threshold.

8. A system for indicating occupant presence within a vehicle, the system comprising:

a driver's seat including a first airbag sensor disposed in the driver's seat and a first seatbelt sensor;

a passenger's seat including a second airbag sensor disposed in the passenger's seat and a second seatbelt sensor;

a vehicle interior heat sensor;

a window or sunroof; and an electronic control unit of the vehicle operatively associated with and in communication with the first airbag sensor, the first seatbelt sensor, the second airbag sensor, the second seatbelt sensor, and the vehicle interior heat sensor, the electronic control unit being configured to open the window or sunroof when:

the first airbag sensor and first seatbelt sensor are disengaged;

the second airbag sensor and the second seatbelt sensor are engaged; and a vehicle internal temperature detected by the vehicle interior heat sensor is above a predetermined threshold for a predetermined amount of time, wherein the electronic control unit is configured to start the vehicle and activate a heating, ventilation, and air conditioning system when a temperature detected by the vehicle interior heat sensor drops below the predetermined threshold, and wherein the electronic control unit is configured to turn off the vehicle when the temperature reaches the predetermined threshold.

* * * * *